May 13, 1958   F. W. CUNNINGHAM   2,834,938

METHOD AND APPARATUS FOR MEASURING THICKNESS

Filed April 14, 1953

INVENTOR.
FREDERICK W. CUNNINGHAM
BY
ATTORNEY.

United States Patent Office 2,834,938
Patented May 13, 1958

2,834,938

METHOD AND APPARATUS FOR MEASURING THICKNESS

Frederick W. Cunningham, Stamford, Conn., assignor to American Bosch Arma Corporation, a corporation of New York Application April 14, 1953, Serial No. 348,703

8 Claims. (Cl. 324—34)

The present invention relates to measuring devices and has particular reference to devices for measuring the wall thickness of hollow castings.

An accurate determination of the wall thickness of hollow castings or where calipers cannot be used has been difficult to make. By means of the present invention, however, a new, simple and economical method of obtaining accurate results is made available. The preferred embodiment comprises a magnet of variable but accurately controllable strength on the outside of the casting and a loose sphere of magnetizable metal on the inside of the casting. The ball is initially attracted by the magnet through the casting, and the magnetic field of the magnet is slowly decreased until the sphere drops. The strength of the magnetic field at the time of release is a measure of the wall thickness.

Figure 1:
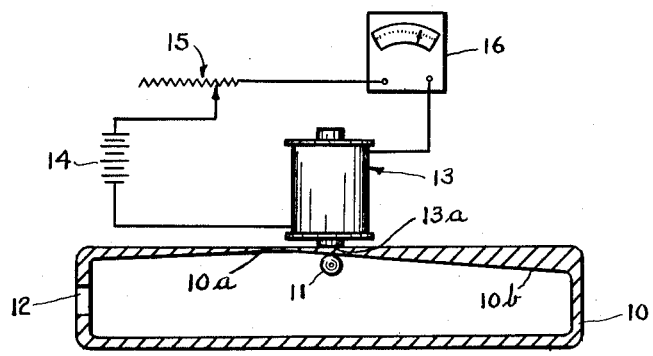
Figure 2:
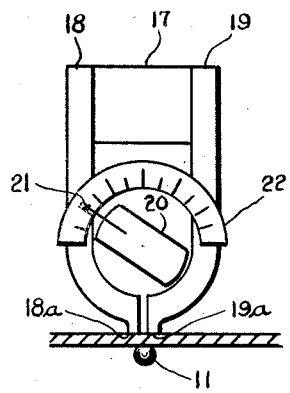

For a better understanding of the invention, reference may be had to the accompanying diagrams, in which, Figure 1 shows one embodiment of the invention; and Figure 2 shows another embodiment of the invention particularly useful in a portable instrument.

Referring now to Figure 1 of the drawings, a casting 10 of which the wall thickness should be measured is shown in cross section. Although the thickness is normally uniform as at the bottom of the casting 10, the wall may have a thin spot 10a where the wall thickness is nonuniform so that the casting may fail mechanically when in use or the wall may have a thicker portion 10b which may cause unbalance, for example, or may be undesirable for other reasons. The present invention is useful in determining the position, extent and magnitude of these "thin" and "thick" areas.

A magnetizable sphere 11, such as the ball of a ball bearing, is introduced inside the casting 10 through a small hole 12. The ball 11 is attracted by the electromagnet 13 which is energized by battery 14 through the variable resistor 15, and is held by the magnet 13 with the wall of the casting 10 between the ball 11 and the magnet face 13a. The strength of the current in the electromagnet is slowly reduced by increasing the circuit resistance by means of resistor 15 until the magnetic field is no longer strong enough to attract the ball and the ball drops. This point may be determined by detecting the impact of the ball as it falls to the bottom of the casting by use of either an audible detector or an instrument designed for a similar purpose. The current in the magnet 13 is then a measure of the distance between the magnet face 13a and the ball 11, which is also the thickness of the wall. The current may be read on the ammeter 16.

The conversion of current, as read on ammeter 16, to thickness of wall must take into account the permeability of the casting material as well as the physical construction of the magnet 13 and sphere 11.

The sphere 11 is placed on the inner top surface of the casting in the case of small casting by initially turning the casting upside down and having the ball 11 roll to a position over the magnet 13 and then turning the casting right side up. In the case of large castings, the sphere may be introduced below the magnet by means of a long rod which is withdrawn after the ball is attracted by the magnet, or the sphere 11 may first be attracted to the magnet 13 with the magnet 13 below the casting, and then carried to the top by moving the magnet around the casting.

Figure 2 shows an alternative arrangement which may be used where no electric power or battery is available. A bar magnet 17 has pole pieces 18 and 19 which concentrate the field of the magnet at the casting. A magnetizable armature 20 is rotatably supported between the pieces 18 and 19, and by adjusting the position of the armature 20 either more or less of the magnetic field is shunted away from the pole faces 18a and 19a so that the field attracting the ball 11 may then be varied.

A pointer 21 on the armature 20 cooperates with a scale 22 whereby the strength of the field at the ball 11 may be determined and the thickness of the wall may be calculated therefrom. For measuring castings of nonmagnetic material the scale 22 can be calibrated directly in units of thickness.

I claim:

1. In a device of the character described for measuring the thickness of a wall, a variable strength magnet adapted to be positioned on one side of a wall, the thickness of which is to be measured, said magnet being movable relative to varying portions of said wall, indicator means for indicating the strength of the magnetic field and a separate, loose, magnetizable member adapted to be positioned on the opposite side of the wall the thickness of which is to be measured from said magnet, said magnetizable member being retained against said opposite side of said wall by said magnet.

2. In a device of the character described for measuring the thickness of a wall, a variable strength magnet adapted to be positioned on one side of a wall, the thickness of which is to be measured, said magnet being movable relative to varying portions of said wall, indicator means for indicating the strength of the magnetic field and a separate, loose, magnetizable member adapted to be positioned on the opposite side of the wall the thickness of which is to be measured from said magnet, said magnetizable member being retained against said opposite side of said wall by said magnet, said magnetizable member being of spherical contour.

3. In a device of the character described for measuring the thickness of a wall, a magnet, means for varying the magnetic strength of said magnet, said magnet being movable relative to varying portions of said wall, and a separate, loose, magnetizable member adapted to be positioned on the opposite side of a wall the thickness of which is to be measured from said magnet, said magnetizable member being retained against said opposite side of said wall by said magnet.

4. In a device of the character described for measuring the thickness of a wall, a magnet, means for varying the magnetic strength of said magnet, said magnet being movable relative to varying portions of said wall, and a separate, loose, magnetizable member adapted to be positioned on the opposite side of a wall the thickness of which is to be measured from said magnet, said magnetizable member being retained against said opposite side of said wall by said magnet, said magnetizable member being of spherical contour.

5. In a device of the character described for measuring the thickness of a wall, a magnet, means for varying the magnetic strength of said magnet, said magnet being movable relative to varying portions of said wall, and a separate, loose, magnetizable member adapted to be positioned on the opposite side of a wall the thickness of which is to be measured from said magnet, said magnetizable member being retained against said opposite side of said wall by said magnet, said magnet comprising an electromagnet and resistance means for varying the magnetic strength of said electromagnet.

6. In a device of the character described for measuring the thickness of a wall, a magnet, means for varying the magnetic strength of said magnet and a separate, loose, magnetizable member adapted to be positioned on the opposite side of a wall the thickness of which is to be measured from said magnet, said magnet comprising a bar magnet having pole pieces and a magnetizable armature rotatably supported between said pole pieces.

7. In a device of the character described for measuring the thickness of a wall, a magnet, means for varying the magnetic strength of said magnet and a separate, loose, magnetizable member adapted to be positioned on the opposite side of a wall the thickness of which is to be measured from said magnet, said magnet comprising a bar magnet having pole pieces and a magnetizable armature rotatably supported between said pole pieces, and scale and indicator means for indicating the thickness of a wall between said magnet and said magnetizable member.

8. The method of ascertaining the thickness of a wall comprising, placing a variable strength magnet on one side of said wall, placing a separate, loose magnetizable member on the opposite side of said wall, said magnet retaining said member in engagement with said wall and decreasing the magnetic field of said magnet until the member drops from said wall whereby the strength of the magnetic field at the time of release of the member is a measure of the wall thickness.

References Cited in the file of this patent

UNITED STATES PATENTS

| | | |
|---|---|---|
| 1,103,358 | Hess | July 14, 1914 |
| 2,637,115 | Watson | May 5, 1953 |